3,272,897
**METHOD OF MAKING POLYMER COATED SUB-
STANCES AND MOLDING THEM INTO AN
ARTICLE**
Daniel F. Herman, Princeton, N.J., and Albert L. Resnick,
Jericho, N.Y., assignors to National Lead Company,
New York, N.Y., a corporation of New Jersey
Filed Nov. 1, 1962, Ser. No. 234,845
20 Claims. (Cl. 264—109)

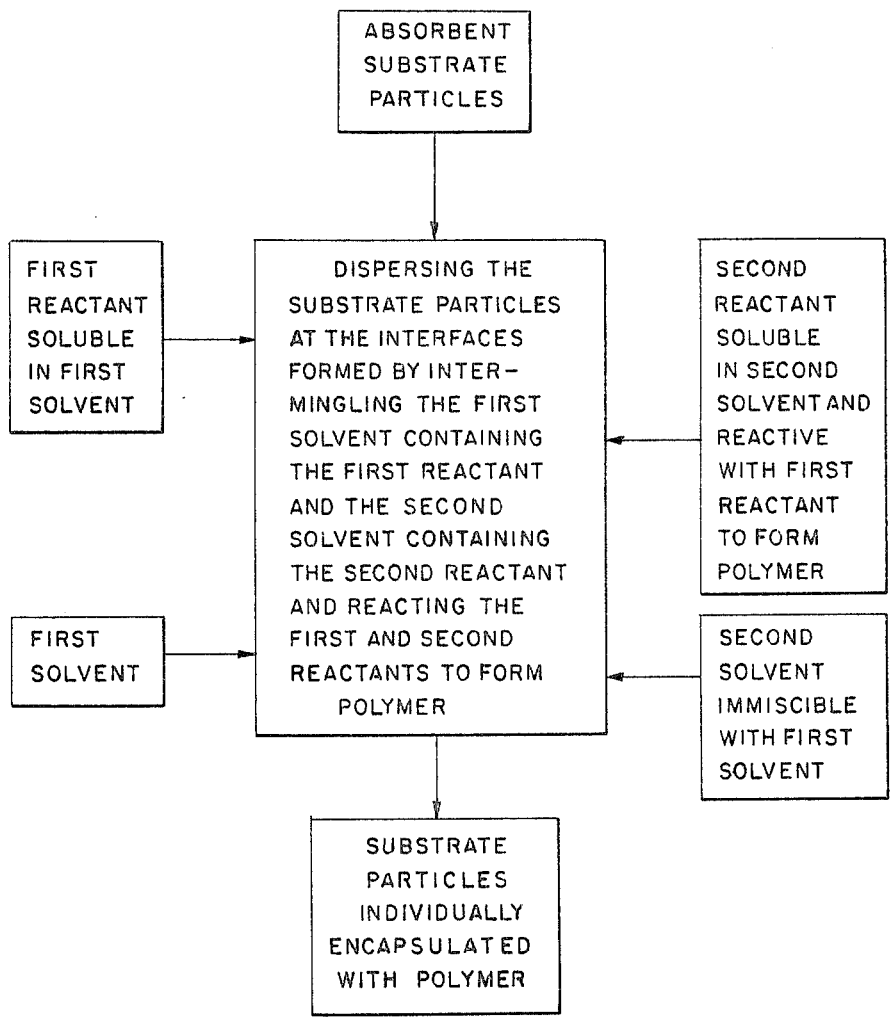

This invention relates to a process for polymerizing materials directly onto the surfaces of absorbent substrates, and to processes for forming useful articles from the resultant products.

More particularly, this invention is concerned with a simple, inexpensive process for forming polymers such as polyamides, polyurethanes, polyphenyl esters, polysulfonamides, polyphthalamides, including polyterephthalamides, or the like, directly on absorbent substrate particles or fibers, such as carbon black, glass, silica, rayon, cellulose, wool, asbestos, and the like. Each individual substrate particle or fiber is substantially encased in a shell of the polymer that is chemically or physically bonded thereto.

Frequently, it is desired to impart plastic properties to a non-plastic material, or to supplement the properties of plastic materials. The result is accomplished by mechanically mixing the two materials to uniformly disperse one in the other. The procedure involves comminuting each of the starting materials, thoroughly mixing them, and then recombining them into a unified product by heat, pressure, etc. The products thus formed are frequently defective because of non-uniformity due to incomplete mixing of the materials.

Likewise, many procedures have been proposed heretofore for coating, impregnating, or otherwise treating wool, asbestos and cellulosic products, such as wood, paper, and various textiles to improve their water resistance, flame resistance, chemical resistance, physical properties, etc. For example, various kinds of wood, paper, cloth and the like, have been impregnated with many different oils, waxes or resins to make the materials more nearly waterproof. Such impregnated products have disadvantages inherent in their method of manufacture. In many cases, as with waxed paper, the impregnating material is essentially removed by heat, solvents, or the like. In other cases, the impregnated paper, wood, or cloth frequently is made brittle and is not able to withstand flexing without having the impregnant crack or peel.

Some fabrics have been lightly plastic coated to waterproof them. For instance, wool has been nylon coated by passing the fabric through a first dipping solution of hexamethylenediamine and then through a second dipping solution of sebacoyl chloride. The cloth was then passed through a set of rollers, or padders, which aid in placing the reacted material in and on the fabric. Coatings applied in this manner have been limited to 2% by weight or less of the weight of the cloth.

Impregnation or coating, whether carried out by spraying, dipping, or other techniques, can be difficult and costly to perform because solvents which are usually required must be evaporated, or otherwise removed, after the impregnation. The impregnant is frequently non-uniformly distributed through the product. Much of the impregnant is wasted by more or less filling all of the porous spaces and other interstices in the base material.

One of the objects of this invention is to provide a process whereby small particles of material may be easily and inexpensively encased individually in shells of a chemical condensation product affixed to the particles.

Another object of the present invention is to provide a process for encapsulating particulate substrates with more than equal amounts, by weight of substrates, of polyfunctional condensation polymers, such as polyamides, polyesters, polysulfonamides, polyurethanes and polyphthalamides, including polyterephthalamides.

Other objects will be apparent to those skilled in the art from reading the following description taken in conjunction with the accompanying drawing in which the single figure is a flow sheet embodying the process steps of the invention.

The objects are accomplished by treating an absorbent substrate material with a first solvent containing dissolved therein a first reactant capable of undergoing polyfunctional condensation polymerization with a second reactant, and dispersing the treated substrate material in a second solvent which is immiscible in the first solvent, thus forming a large number of discrete interfaces between the two dispersed immiscible solvents on the substrate. A second reactant soluble in the second solvent is added to the resultant mixture and is capable of undergoing at each of the interfaces a polyfunctional condensation polymerization with the first reactant dissolved in the first solvent. The polymer thus formed is affixed into and on the substrate material due to the first reactant being retained in the substrate material. That is, the first solution permeates the substrate material. Thus, the first reactant in the first solution is available in the substrate material and reacts therein with the second reactant. Polymer is accordingly formed inside the substrate material and conforming to the voids of the substrate material becomes anchored thereto. As an alternate, the process may be carried out in two steps. In the two step process the second solvent contains the second reactant dissolved in it, thus eliminating the third step of dissolving the second reactant after dispersing the treated substrate material in the second solvent.

An essential feature of the invention includes the use of discrete particles or fibers as a substrate material. Each particle individually acts as a polymerization site and maintains its individuality throughout the process, thus resulting in a particulate free-flowing product.

In the process of this invention, the interface of two immiscible liquids is made to coincide with the outer surface of a substrate particle. This is accomplished by adding to the particle an amount of one of the liquids which it can retain. Upon dispersing the substrate particle in the other immiscible liquid, the interface is coextensive with the surface of the substrate particle.

The substrate materials intended for use in the process of the invention must be capable of retaining in voids, or on their surfaces, or both, an amount of solvent containing one of the reactants. The amount of solvent retained is one of the determining factors in controlling the amount of polymer formed on the substrate material. Other factors include the concentration of the reactants. The more reactant retained the greater the amount of polymer that will be formed on the substrate material. However, if excess solvent is added free polymer will be formed that is not attached to the substrate material. The amount of the solvent which is desired to be retained is that amount of solvent which, when added to the free-flowing substrate material, just causes it to become non-free-flowing. The desired amount of solvent thus added, when saturated with the first reactant, determines the maximum amount of polymer which may be formed on the substrate material. The substrate materials must be non-reactive with the reactants, solvents, etc.

The desired amount of solvent may be determined by ascertaining the water absorbence of the substrate. Water absorbence of substrates may be determined by adding water from a burette to a weighed quantity of substrate, while stirring. The maximum absorbence may be taken as that amount of water required to make the substrate into essentially a single, coherent mass, which will start to exude water when pressed lightly against the containing vessel. This test may be considered only roughly quantitative, since it may be difficult to uniformly wet any given substrate. Typical results are shown in Table I. Table I shows the maximum amount of water which can be added to the substrate material before the substrate material becomes non-free-flowing. The minimum amount of water is the least amount of water that can be added to the substrate material.

TABLE I.—ABSORPTION OF WATER BY VARIOUS SUBSTRATES

| Substrate Material | Weight of Material (grams) | Water Added (milliliters) | Approximate Ratio Water to Substrate |
|---|---|---|---|
| Cellulose | 2 | 10.2 | 5:1 |
|  | 5 | 24.5 | 5:1 |
|  | 10 | 50.5 | 5:1 |
| Asbestos | 5 | 5.7 | 1:1 |
| Carbon Black | 10 | 9.9 | 1:1 |
| Wool | 2 | 14.5 | 7:1 |
| Viscose rayon | 5 | 33.0 | 7:1 |

The characteristic of the substrate material to retain a solvent in voids or on its surface is described herein as "absorbency," and the materials having this characteristic are described as "absorbent." It is to be understood that where the terms "absorbent" or "absorbency" are used herein, they are intended to describe the characteristics of the substrate materials as defined. While a non-aqueous solvent solution may be absorbed on the substrate material, it is preferable that an aqueous solution of one of the reactants be absorbed on the substrate material.

The exact mechanism by which the substrate material retains the solvent is not fully understood. However, it is possible that where the substrate material consists of small bundles of rod-like materials defining tubular passages in their interstices, some of the solvent is retained therein due to capillary action. Where the substrate material is a single particle, it is possible that the solvent is retained thereon due to the affinity of the solvent for the substrate material. However, the invention is not to be limited to any theory of operation.

The process of encasing individual particles or fibers of substrate material in shells of polymer in situ in accordance with the present invention is carried out by polymerization at the interfaces of two immiscible solvents. The term "shells," as used herein, includes shells, sleeves, tubes, capsules and the like. The process is desirably a polymerization of two rapidly-reacting reactants capable of undergoing a polyfunctional condensation polymerization at the interface of two phases of a heterogeneous, immiscible liquids or solvents system.

In the polymerization one reactant is dissolved in a first solvent and absorbed by the substrate material. The treated substrate material is dispersed in a second solvent which is immiscible in the first solvent. A second reactant is then dissolved in the second solvent. Alternatively, the second reactant may be dissolved in the second solvent before the treated substrate material is dispersed in the second solvent. Polymerization of the two reactants occurs at the interface of the two solvents to form a polymer on the substrate material maintained at the interface. The reaction is usually substantially instantaneous, hence, the second reactant or the solution containing the second reactant must be added slowly to avoid an uncontrolled reaction.

The reactants used in the chemical condensation polymerization react when mixed together to produce a stable polymer. Any reactants known to polymerize by an interfacial condensation reaction, at least one of which is soluble in a first solvent and another of which is soluble in a second solvent, said second solvent being immiscible with said first solvent, may be used in the practice of this invention.

Any two solvents may be utilized which are mutually immiscible and which do not react with each other, with the substrates, or with the reactants, and do not dissolve the polymer formed. A preferred solvent system consists of water and an organic solvent, such as benzene, toluene or carbon tetrachloride. However, two non-aqueous solvents, such as methanol and heptane, may be utilized to provide a solvent system. Where the solvent system characteristics are described herein as a water-organic system, it is to be understood that any other suitable solvent system may be substituted therefor.

There is no upper limit on the ratio of the organic to the aqueous solution. The organic solvent preferably is selected to have a lower density than water, but such is not critical to the success of the process. The reverse phase, where the organic solvent has a greater density than water, is equally effective.

An organic diamine and an organic dicarboxylic halide are a preferred combination of reactants to be employed in the process of the invention. For example, hexamethylenediamine (1,6-hexanediamine) reacts with adipoyl chloride to form 6,6-polyhexamethylene adipamide (nylon 6, 6) and with sebacoyl chloride to form 6,10-polyhexamethylene sebacamide (nylon 6, 10). Also, hexamethylenediamine reacts with bischloroformates, such as ethylene glycol bischloroformate, to form polyurethanes, and with terephthaloyl chloride to form a polyterephthalamide. Bisphenol A [2,2'-bis (4-hydroxy phenyl) propane] and adipoyl chloride condense to form polyphenyl esters. A copolymer results when more than one reactant is used in either of the two liquid phases. For example, hexamethylene diamine in aqueous solution reacts with both adipoyl chloride and sebacoyl chloride when they are present to produce a copolymer consisting of nylon 6, 6 and nylon 6, 10.

The highest molecular weight polymers are obtained when relatively pure reactants are employed. Lower grade reactants may be employed but the molecular weight of the condensation product is lower.

While the present invention will be discussed in terms of encapsulating small "particles" or "fibers" or "particulate substrates," it is to be understood that the terms are intended to encompass particles, short filaments and fibers of the material. In the practice of the invention, various particle sizes may be employed, and if it is desired to obtain specific properties, different sizes and shapes may be blended or otherwise employed.

The substrate materials are preferably limited to small particles and fibers. Particles greater than 30 mesh (U.S. Standard screen size) will usually not be successfully encased. Preferably particles are limited to those passing a 200 mesh screen (about 74 microns maximum size). Similarly, fibers to be encased should desirably be no longer than 1000 microns, and preferably are in the 500–800 micron range. The longer fibers tend to agglomerate, preventing uniform polymer distribution in the shell, and preventing the formation of a free-flowing, polymer encapsulated product. However, longer fibers, up to a quarter of an inch, may be encased by reducing the concentration of the fibers in the solvent in order to avoid agglomeration. That is, when the longer fibers are used, greater amounts of the solvent must be used with the substrate material, resulting in reduced ratios of polymer to substrate material.

The substrate materials that have been used experimentally with great success are cellulose, asbestos, wool, fiberglass, silica, rayon, carbon black, lead, barium titanate and polyester fibers. It was found that the physical connection of the polymer to the substrate may be improved by treating the substrate material to increase the surface area prior to encapsulation, for example, by etching the surface of fiberglass.

The substrate material retaining the first solvent must be thoroughly dispersed in the second solvent. Agitation is necessary to insure the intimate mixing of the particles and the reactants to obtain successful encapsulation. Insufficient mixing results in a high percentage of free polymer, that is, polymer which is not disposed on the substrate material. However, where excessive agitation or extreme turbulence are imparted to the liquid, where the solid components are mechanically abraded, etc. the separation of the coating from the substrate may result. Exposure to the action of the agitator, for instance, a high-shear blender, should be for short periods only. Also, emulsification is to be avoided because excessive amounts of free polymer are formed.

An inorganic or organic base may be added to neutralize any acid formed as a by-product of the condensation reaction. The reaction between one mole of organic diamine and one mole of diacid chloride results in the production of two moles of hydrogen chloride. Thus, the base is desirably present in a molar ratio of 2:1 to each of the condensation reactants. The base accepts or neutralizes the acid and is termed an acid-acceptor. The highest ratios of polymer coating to substrate material are obtained using sodium acetate as an acid-acceptor.

Preferably, sodium carbonate in the aqueous phase is used as the acid-acceptor. Potassium hydroxide and sodium hydroxide have also been used successfully. Where one of the reactants is itself alkaline, for example, hexamethylenediamine, the reactant may be used in sufficient excess to act as the acid-acceptor. This is particularly desirable when wool is used as the susbtrate since strong bases tend to dissolve the wool. When the acid-acceptor is supplied by an excess of diamine, the wool is not harmed.

The alkaline base, or acid-acceptor, is desirably added to the aqueous solution. Where too high a concentration of the solute is used for the amount of alkali to be dissolved therein, addition of the base will cause two immiscible layers to form. The effect is undesirable since interferes with complete intermingling of the solutions containing the reactants. The problem is solved by limiting the concentration of the solute. The effect of a limited solute concentration in the water phase combined with a limited capacity of the substrate to absorb the aqueous solution limits the polymer concentration. The two effects limit the quantities of solute available for reaction with the solute contained in the water immiscible solvent. Therefore, the limit to the amount of polymer which can be deposited varies with the substrate, the acid acceptor and the reactants and their concentrations. Using cellulose as a substrate material, sodium carbonate as an acid-acceptor, and hexamethylenediamine and adipoyl chloride as reactants, the maximum hexamethylene adipamide polymer formed on the cellulose is about 100% by weight based on the weight of substrate. By mercerizing the cellulose causing it to imbibe more water, the coating of polymer may be increased to more than 150% by weight on the same basis.

The polymer-encapsulated substrate material on drying frequently tends to agglomerate. A preferred way of reducing and preventing the agglomeration consists in stirring the encapsulated product in a mixing apparatus under controlled conditions for brief periods. Another procedure to reduce occurrence of such agglomeration lies in the use of a liquid, such as acetone, to wet the substrate materials before adding the solutions of condensation reactants. One possible cause of agglomeration may be surface tension effects caused at the interface when the substrate material is wetted with one solvent and slurried in the second solvent. The surface tension results in balling of the substrate and prevents the reactants from contacting the individual fibers or particles to form a uniform shell on each fiber or particle.

The condensation reaction is exothermic and proceeds well at room temperatures of about 20° C. The reaction can be carried out at temperatures below 20° C. or at temperatures up to the boiling point of the lower boiling solvent. High temperatures are not preferred since the condensation reaction may become too rapid. At temperatures substantially below 0° C., the reaction proceeds slowly. The preferred temperature ranges from 20° to 80° C.

The condensation polymerization reaction may be carried out at atmospheric pressure, or at higher pressure if desired. Ordinarily, the polymerization proceeds rapidly at atmospheric pressure and elevated pressures are not necessary.

The amount of polymer formed will vary with the amount of condensation reactants available for reaction. The condensation reaction and formation of polymer is usually essentially instantaneous; however, the amount of polymer deposited does vary in proportion to time.

The regulation of concentration and amount of the condensation reactants is another important feature of the invention in providing optimum results. There is a maximum ratio of first solvent to substrate that can be utilized, and a maximum concentration of solute. The amount of first solvent should desirably not be more than is necessary to completely wet the substrate, that is, the substrate should totally absorb all of the first solvent as described above. After saturation, the solvent-containing substrate is preferably a moist solid prior to the addition of the second solvent. If excess first solvent is used, there will be free liquid apart from the substrate, which free liquid contains one of the reactants. Upon addition of the second solvent or phase in such a case, free polymer will be formed apart from the substrate. Where cellulose is used as the substrate, and water as the first solvent, the maximum ratio of water to cellulose is about 5:1 on a weight basis, as seen in Table I.

Where a simple encasing of the particles or fibers of the substrate is desired, only a small amount of polymer need be formed. Where the polymer encased substrate is to be heat-sealed, at least 33 percent by weight of polymer shell (based on the weight of substrate material) is desirably present. The substrate must be compatible to heat sealing. For forming purposes, a minimum of 33 percent by weight of polymer shell (based on the weight of substrate material) is desirably present.

The polymer coated particles of the present invention can readily be molded or otherwise formed into products of varying porosity providing the substrate material can withstand the elevated temperatures. The polymer encased particles are free-flowing, can readily be poured into a mold or any shape and may be formed into an article by pressure alone, heat alone, or by a variety of combinations of heat and pressure. The manner by which the article is formed depends, to a great extent, on the properties required in the finished product, the properties of the substrate material, the size of the encased particles, the percentage of polymer on the encased particles, and the properties inherent in the particular polymer coating. Simple heating without pressure fuses the particles together to form a self-sustaining article. When molded without any substantial pressure, the article is very porous and readily permits the passage of gases and, under proper conditions, of most liquids. Such a product is very light in weight and provides an excellent heat or sound insulating medium.

Increasing the temperature or pressure or increasing both the temperature and pressure results in an increase in density and a reduction in porosity. Temperatures as high as, or somewhat above, the melting point of the polymer coating may be employed. Where maximum tensile strength in the finished article is of importance, it is preferable to form the polymer encased material at a temperature at, or slightly above, the melting point of the polymer coating. With products coated with copolymers, the temperature of heating may be somewhat lower depending on the melting point of the copolymer coating.

The porosity of such products can be reduced to any desired degree by performing the molding operation under the requisite amount of pressure along with the heating of the material to the fusing temperature. Porous products that are excellent for special filtering operations can be made from the molding powders of the invention.

Sheets and molded articles of high density which are impervious to the passage of hot or cold liquids may be formed by molding the article or sheet from particles or fibers encased in high polymer contents at the requisite fusing temperature and under a pressure of the order of 2,000 to 10,000 pounds per square inch. In this way the molding material of the invention may be used to form inexpensive articles. Cellulose particles encased with a polymer in accordance with the invention can be molded under lower pressures, such as 5 to 50 pounds per square inch to form sheet materials that are useful as semipermeable membranes.

In addition, the molding materials of the invention can be used to form laminated structures in which the powder is fused, or pressed and fused, about wire, solid metal or any desired core material to produce a product of the desired porosity. Sheets or other articles can be readily heat-sealed to each other or to other heat-sealing materials to produce thermoformed, shaped, paper-like material for use as boxes and cartons. Also, the substrate particles may be removed leaving hollow polymer shells, suitable among other things, for forming.

Another way in which molding powders made according to the process of the invention may be used is to form them into articles with the aid of a solvent for the polymer. The molding powder may be softened by means of solvents for the polymer, and the softened mass formed into an article of the desired shape which becomes permanent upon evaporation of the solvent. The solvent selected and the temperature used will vary with the polymer. For example, with 6,6-hexamethylene adipamide encased products, dimethyl formamide may be used at a temperature of 75–90° C., or a better solvent, such as m-cresol, may be used at a lower temperature to soften the mass, while formic acid and trifluoroacetic acids are also suitable. For most purposes, however, a wide variety of products can be made by heat alone, pressure alone, or by a combination of heat and pressure, without using any solvent for the polymer.

The encapsulated fibers may be added to slurries of cellulose fibers, synthetic fibers or the like, in a papermaking process to produce novel products. The encapsulated fibers may be added to dry blends in dry web forming processes in non-woven fields.

In order that the invention may be more readily understood, the following examples are given. Throughout the examples, the lengths of substrate material used are: cellulose, 600 microns; wool, rayon and polyester resin fibers, 0.5 cm.; glass fibers, 800 microns; carbon black, 0.1–0.2 micron; silica, 9 microns and barium titanate, 2 microns. Conversions of monomer to polymer are expressed in percentages of theoretical yields.

EXAMPLE I

*Preparation of nylon 6,6 encased cellulose for sheet making*

Sixty grams of cellulose fibers were wet with 225 milliliters (ml.) of acetone, and to the slurry were added with stirring 0.40 mole (47.4 g.) of 1,6-hexanediamine and 0.816 moles (32.6 g.) of sodium hydroxide contained in 300 ml. of water. The cellulose absorbed substantially all of the liquid. The cellulose was transferred to a 3-neck flask equipped with a stirrer and dropping funnel, and 1 liter of toluene was added to the flask. With stirring, 0.408 mole (72 g.) of adipoyl chloride contained in 150 ml. of toluene were added over a period of 10 minutes. The temperature rose to about 60° C., and stirring was continued for several minutes, and then the toluene was decanted. The product was washed with methanol, filtered, washed with water, re-filtered and stirred in a Waring Blendor with methanol to reduce any agglomerates and produce a free-flowing particulate product. The methanol was removed by filtering. The product in the form of nylon-encased cellulose was slurried in 350 ml. of water and used directly on a laboratory sized paper making machine to prepare sheets of nylon-encased cellulose.

Sheets of varying porosity and tear strength were prepared by pressing the original sheets of nylon-encased cellulose at different pressures and temperatures. A portion of the nylon-encased cellulose slurry was dried and shown to contain nylon coated upon the individual cellulose fibers equal to 89% by weight, of the cellulose. Treatment of the product with cupric ammonia complex dissolved the cellulose leaving the nylon behind essentially in hollow tubular form.

EXAMPLE II

*Preparation of nylon 6, 6 encased cellulose fibers with cellulose containing the water phase*

To 5 g. of cellulose were added 61.7 ml. of water containing 0.034 mole (3.95 g.) of 1,6 hexanediamine and 0.068 mole (3.19 g.) of potassium hydroxide. The resulting cellulose paste containing all of the liquid was placed in a Waring blender together with 150 ml. of benzene. While stirring at low speed, there were slowly added 0.034 mole (6.22 g.) of adipoyl chloride dissolved in 69 ml. of benzene. After 2 minutes, the blender speed was increased to high and the addition continued for another 2 minutes. The product was decanted, soaked in methanol, filtered and dried. Product dried into small, hard pieces which could easily be reduced to a fibrous form in a Waring Blendor. The product was made up of free-flowing particles which weighed 9 g. and consisted of cellulose fibers encased in 77.5 percent nylon by weight of cellulose. The conversion was 52%. The product was molded into sheets by pressing at 230° C. and 6,000 pounds per square inch (p.s.i.).

EXAMPLE III

*Preparation of nylon 6, 6 encased cellulose from a non-aqueous sytem*

Ten grams of cellulose were slurried in 50 ml. of methanol containing 0.22 M (4.9 g.) of sodium hydroxide and 0.0608 M (7.8 g.) of 1,6 hexanediamine. The mixture was then transferred to a 3 neck-flask containing 250 ml. of n-heptane. While the flask contents were rapidly stirred, 11.2 g. (0.0608 M) of adipoyl chloride dissolved in a mixture of 50 ml. of n-hepane and 14 ml. of toluene were added drop-wise. After several minutes the heptane was filtered, and the product was washed first with methanol, then with water and dried. The cellulose-nylon product weighed 15.4 g. of which 5.4 g. was nylon encapsulated on the cellulose. The capsule was 54% the weight of the cellulose.

EXAMPLE IV

*Preparation of nylon 6, 6 encased cellulose by addition of the two phases to a cellulose slurry previously wetted with acetone*

Five grams of cellulose fibers were wet with 50 ml. of acetone and then slurried with 150 ml. of toluene and transferred to a 3-neck flask equipped with a stirrer and dropping funnel. With stirring, 61.7 ml. of water containing 0.034 mole (3.95 g.) of 1,6 hexanediamine plus 0.068 mole (3.19 g.) of potassium hydroxide were added followed by the slow addition of 65 ml. of toluene containing 0.034 (6.32 g.) of adipoyl chloride. Stirring was continued for 15 minutes after which the toluene was decanted; the product was washed with methanol and water, successively, and dried. The product was in the form of tiny agglomerates which were easily restored to a free flowing, fibrous form in a Waring blender. The nylon encased cellulose product weighed 9.4 g., or 88% nylon by weight of cellulose, which was encased on the cellulose fibers in the form of shells. The conversion was 57.5%. Sheets were made of this product by molding at appropriate temperatures and pressures.

EXAMPLE V

*Preparation of nylon 6, 10 encased cellulose by reaction between 1,6 hexanediamine and sebacoyl chloride*

Twenty-five grams of cellulose fibers were wet with 35 ml. acetone, and to the slurry were added 0.170 mole (19.7 g.) of 1,6 hexanediamine plus 0.34 mole (13.6 g.) of sodium hydroxide contained in 125 ml. of water. The cellulose, which had absorbed all of the liquid, was transferred to a 3 neck flask and slurried with 400 ml. of toluene. With stirring, 0.17 mole (40.6 g.) of sebacoyl chloride dissolved in 100 ml. of toluene were slowly added. The reaction mixture was stirred for a short while after addition then the toluene was filtered, the product washed with methanol and water and dried. The product consisted of tiny agglomerates which could easily be reduced to a free-flowing fibrous form in a Waring blender. The product weighed 46 g., equivalent to 82% nylon 6, 10, by weight of cellulose, encased on the cellulose. The conversion was 39%. The cellulose was extracted by cupric ammonia complex leaving the nylon behind in an essentialy hollow tubular form. The product was made into sheets by molding at 180° C. and 6,000 p.s.i.

EXAMPLE VI

*20:80 copolymer of nylon 6, 6 and nylon 6, 10 encased on cellulose by reaction between adipoyl chloride, sebacoyl chloride and hexanediamine*

Twenty grams of cellulose fibers were wet with 25 ml. of acetone followed by addition of 0.136 mole (15.8 g.) of hexanediamine plus 0.272 (10.9 g.) of sodium hydroxide dissolved in 100 ml. of water. The cellulose, which had absorbed substantially all of the liquid, was transferred to a 3 neck flask, slurried with 500 ml. of toluene, and to this were slowly added 0.109 mole (27.1 g.) of sebacoyl chloride plus 0.027 mole adipoyl chloride in 100 ml. of toluene. After addition, the toluene was decanted, the product washed with methanol and water, filtered and dried. The product consisted of free-flowing particles which weighed 35.5 g., equivalent to 77.5% (by weight of cellulose) of a 20:80 adipoyl-sebacoyl nylon copolymer encased upon the cellulose. The product was molded into a porous block by heating at 175° C. for one and one-half hours under slight pressure.

EXAMPLE VII

*Polyterephthalamide from hexanediamine and terephthaloyl chloride encased on cellulose fibers*

Ten grams of cellulose fibers were wet with 15 ml. of acetone followed by the addition of 0.068 mole (7.8 g.) of 1,6 hexanediamine plus 0.136 mole (5.4 g.) of sodium hydroxide dissolved in 30 ml. of water. The cellulose, which had absorbed substantially all of the liquid, was transferred to a 3 neck flask, slurried with 250 ml. of toluene, and to this were added slowly 0.068 mole (13.8 g.) of terephthaloyl chloride dissolved in 60 ml. of toluene. As the temperature increased, the mixture was stirred for a short while, and then the toluene was decanted. The product was washed with methanol and water, filtered and dried. The product weighed 13.5 g., equivalent to 35 percent polyterephthalamide per weight of cellulose. The product consisted of small agglomerates which were easily reduced to a free-flowing fibrous cellulose material encased with polymer.

EXAMPLE VIII

*Cellulose fibers encased with polyphenyl ester-reaction between 2,2'-bis (4-hydroxy phenyl) propane and adipoyl chloride*

Twenty-five grams of cellulose fibers were wet with 30 ml. of acetone and to the wetted material were added 0.109 mole (25 g.) of bisphenol A [2,2'-bis (4-hydroxy phenyl) propane] plus 0.218 mole (8.6 g.) of sodium hydroxide dissolved in 115 ml. of water. The cellulose, which had absorbed substantially all of the liquid, was transferred to a 3 neck flask and slurried with 500 ml. of toluene. To the slurry were added slowly 0.109 mole (20 g.) of adipoyl chloride dissolved in 100 ml. of toluene. The reaction mixture was stirred; the toluene decanted. The mixture was washed with methanol and water, filtered and dried. The product consisted of free-flowing fibers weighing 33 g., equivalent to 31.6 percent polyphenyl ester, by weight of cellulose, encased upon the cellulose. The cellulose was extracted with cupric ammonia complex leaving the polymer behind in hollow tubular form.

EXAMPLE IX

*Nylon 6, 6 encased on carbon black*

Five grams of carbon black particles were stirred vigorously with 25 ml. of water containing 0.034 mole of 1,6 hexanediamine and 0.068 mole of sodium hydroxide. To the slurry were added with hand stirring about 7 ml. of acetone in order to make the carbon black-water dispersion more homogeneous. Then 0.034 mole of adipoyl chloride dissolved in 50 ml. of toluene were added slowly to the carbon black-water dipsersion. The mixture became hot and lumped up somewhat, but then with more stirring became smooth again. The liquid was decanted; the product was washed with methanol, then with water, filtered and dried. The free-flowing product weighed 9 g., equivalent to 77.5 percent nylon 6, 6 by weight of carbon black, encased on the individual particles of carbon and did not smear when pressed between the fingers. The conversion was 51.5%.

EXAMPLE X

*Nylon 6, 6 encased on carbon black*

In 160 ml. of water there were dissolved 0.258 mole of 1,6 hexanediamine and 0.516 mole of sodium hydroxide. To this 25 g. of carbon black were added and stirred until a homogeneous dispersion was obtained. This was then added to a one liter, 3 neck flask fitted with a dropping funnel and stirrer. To the carbon black dispersion was added, dropwise, a solution of 0.258 mole adipoyl chloride in 125 ml. of toluene. After one-half of the solution was added, the flask contents became pasty and very hot. The dispersion was then thinned with 200 ml. of toluene and the adipoyl chloride addition completed. The liquid was decanted; the product washed well with the methanol and water, then filtered and dried. The free-flowing product weighed 50 g., equivalent to 100 percent nylon 6, 6 by weight of carbon black, encased upon individual particles of the carbon black. The conversion was 42%. The polymer-encased particles did not smear when rubbed between the fingers. The product was molded into a sheet under heat and pressure.

EXAMPLE XI

*Nylon 6, 6 encased on cellulose by "Phase Inversion"*

Adipoyl chloride (0.034 mole) was dissolved in 25 ml. of carbon tetrachloride. The solution was thoroughly mixed with 5 g. of cellulose fibers and the mixture transferred to a 500 ml. flask fitted with a stirrer and a dropping funnel which contained 0.034 mole of 1,6 hexanediamine and 0.068 mole of sodium hydroxide in 50 ml. of water. To the flask contents there were added, rapidly and with stirring, 200 ml. of ice-cold water. This addition was immediately followed by the addition of the amine-sodium hydroxide solution at a moderate rate. Stirring was continued for several minutes followed by filtering, washing with water and methanol and drying. The dried product was agitated in the dry state for a few seconds in a Waring Blendor to form a free-flowing material. The product was hydrophobic and floated upon water.

EXAMPLE XII

Nylon 6, 6 encased on cellulose at low loading

A slurry of 19.6 g. of cellulose fibers was prepared in 50 ml. of water containing 0.0058 mole of 1,6 hexanediamine and 0.016 mole of sodium hydroxide. The slurry was then added to a one liter flask fitted with a stirrer and dropping funnel. With good stirring, 250 ml. of toluene were added to the cellulose followed by the dropwise addition of 0.0058 mole of adipoyl chloride dissolved in 15 ml. of toluene. The liquid was decanted and the product washed with methanol and water and dried. The free-flowing product contained about 0.4 g., equivalent to 2 percent, by weight of cellulose, of nylon 6, 6 encased upon the cellulose fibers. Under a microscope it could be seen that cupric ammonia solution dissolved the cellulose leaving behind small tubes of nylon.

EXAMPLE XIII

Nylon 6, 6 encased on wool

Three grams of combed wool were cut into staples of about 1/8" in length. The wool was then soaked in 30 ml. of water containing 0.03 mole of 1,6 hexanediamine. The slurry was transferred to a 500 ml. flask, and 250 ml. of toluene were added with stirring. Through a dropping funnel, 0.015 mole of adipoyl chloride in 50 ml. of toluene were added slowly. Stirring was maintained for a short time after which the liquid was decanted and the product washed with methanol, then water, followed by filtering and drying. The free-flowing product weighed 4.2 g. of which 1,2 g. (40 percent by weight of wool) was nylon 6, 6. Under a microscope it could be seen that the nylon polymer was encased upon the wool.

EXAMPLE XIV

Nylon 6, 6 encased on asbestos

There were dissolved in 50 ml. of water 0.068 mole (7.8 g.) of 1,6 hexanediamine and 0.136 mole (5.4 g.) of sodium hydroxide. Into the resulting solution there were slurried 10 g. of asbestos fibers. Then, over a hot plate 7.3 g. of water were evaporated to provide a thicker slurry. The slurry was transferred to a flask; there were added 250 ml. of toluene and the mixture stirred for 10 minutes. There were added slowly 0.068 mole (12.4 g.) of adipoyl chloride in 50 ml. of toluene. The mixture was stirred, the toluene decanted; the solids were washed in methanol, then water, filtered and dried. There were recovered 16 g. of grey, hard material which was treated in a Waring Blendor to restore the free-flowing fibrous nature of the asbestos. The product consisted of 60 percent nylon 6, 6 by weight of asbestos, encased on the asbestos fibers.

EXAMPLE XV

Nylon 6, 6 encased on glass fibers

There were prepared 100 g. of a 15 percent aqueous solution of potassium dichromate, and 5 ml. of sulfuric acid were added to it. Ten grams of 1/32 inch long glass fibers were etched by being placed in the resulting solution overnight. The fibers were washed with water and dried with acetone. The glass fibers were then immersed in 25 ml. of water containing 0.068 mole of 1,6 hexanediamine and 0.136 mole of sodium hydroxide. With stirring the glass fiber-water mixture was transferred to a 3 neck flask containing 200 ml. of toluene. Adipoyl chloride, 0.068 mole, dissolved in 50 ml. of toluene, was added slowly. After several minutes of stirring the liquid was decanted; the residue was washed with methanol, then with water and dried. There were recovered a total of 11.7 g. of free-flowing product containing 1.7 g. (17 percent by weight of glass) of nylon 6, 6 polymer encased upon the glass fibers.

EXAMPLE XVI

Nylon 6, 6 encased on silica particles

Five grams of silica were stirred for 15 minutes in 200 ml. of toluene containing 0.034 mole of adipoyl chloride. With stirring there were added over a 2-minute period 25 ml. of water containing 0.034 mole of 1,6 hexanediamine and 0.068 mole of sodium hydroxide. The mixture was stirred for several more minutes. The toluene was decanted and the product washed with methanol and water. The free-flowing product weighed 7.6 g. consisting of 2.6 g. (51.5 percent, by weight of silica) of nylon 6, 6 encased upon the silica particles.

EXAMPLE XVII

Nylon 6, 6 encased on rayon fibers

Five grams of short fiber rayon were stirred in a 3 neck flask with 200 ml. of acetone containing 0.034 mole of 1,6 hexanediamine, 0.068 mole of sodium hydroxide and 25 ml. of water. To the slurry were added over a 15-minute period, 0.034 mole of adipoyl chloride in 50 ml. of toluene. The mixture was stirred for several minutes, the liquid decanted, and the product washed with methanol, then with water, and dried. The free-flowing product weighed 8.1 g. consisting of 3.1 g. (61 percent by weight of rayon) of nylon 6, 6 encased on the rayon fibers.

EXAMPLE XVIII

Nylon 6, 6 encased on polyester resin fibers

Five grams of short Dacron fibers were soaked in 25 ml. of water containing 0.034 mole of 1,6 hexanediamine and 0.068 mole of sodium hydroxide. Dacron is a trademark for polyester fibers made from polyethylene terephthalate. The mixture was placed in a 3 neck flask together with 250 ml. of toluene and stirred. Then over a 2-minute period 0.034 mole of adipoyl chloride in 50 ml. of toluene were added. After several minutes of stirring, the liquid was decanted, the product washed with methanol and with water and dried. The free-flowing product weighed 8.9 g. consisting of 3.9 g. (77.5 percent by weight of Dacron) of nylon 6, 6 encased on the fibers. The conversion was 50.5%.

EXAMPLE XIX

Encasing of barium titanate particles with nylon 6, 6

Ten grams (0.116 mole) of 1,6 hexanediamine were dissolved in 5 ml. of water. To this solution were added with stirring 10 g. of barium titanate particles and the mixture transferred to a 500 ml. flask. Using rapid stirring, 250 ml. of toluene were added to the flask and stirring continued for several minutes. Then, 12.4 g. (0.068 mole) of adipoyl chloride dissolved in 50 ml. of toluene were slowly added to the mixture by means of a dropping funnel. After stirring for several minutes, the toluene was decanted and the product washed well with methanol, then with water, and dried. The product was then passed dry through a Waring Blendor to give 13 g. of free-flowing, slightly tan product. The product contained 3 g. (30 percent by weight of barium titanate) nylon 6, 6 encased on the barium titanate particles.

EXAMPLE XX

Preparation of cellulose encapsulated with polyurethane

Fifteen grams of cellulose fibers were dispersed in 500 ml. of toluene. Then, 87 ml. of water containing 0.127 solution of a first polymer-forming reactant into the finely divided particles, adding a water immiscible organic solvent, agitating to disperse uniformly said particles in said water immiscible organic solvent and to form a plurality of discrete interfaces between said aqueous solution and said water immiscible organic solvent, adding a second polymer-forming reactant soluble in said organic solvent, whereby said first and second reactants polymerize at said interfaces to form individual polymer capsules substantially enclosing each of said particles.

5. A process for substantially enclosing each of a plurality of finely divided particles with a polymeric capsule comprising treating the finely divided particles with an aqueous solution of an organic diamine until said particles are saturated with said solution, adding a water immiscible organic solvent, agitating to uniformly disperse the saturated particles in said water immiscible organic solvent, whereby a plurality of discrete interfaces are formed between said aqueous solution and said water immiscible organic solvent, adding an organic dicarboxylic acid halide soluble in said organic solvent, whereby said organic diamine and said organic dicarboxylic acid halide polymerize at said interfaces to form polyamide capsules substantially enclosing each of said particles.

6. A process for substantially enclosing each of a plurality of finely divided particles with up to about equal weight of a polymeric capsule comprising saturating the finely divided particles with an aqueous solution of an organic diamine, adding a water immiscible organic solvent, agitating to uniformly disperse the saturated particles in said water immiscible organic solvent, whereby a plurality of discrete interfaces are formed between said aqueous solution and said water immiscible organic solvent, adding an organic dicarboxylic acid halide solution in said organic solvent, whereby said organic diamine and said organic dicarboxylic acid halide polymerize at said interfaces to form polyamide capsules substantially enclosing each of said particles.

7. A process for substantially encasing each of a plurality of finely divided particles with up to about 150% by weight of a polymeric capsule comprising treating the particles to increase their water absorbence, saturating said particles with an aqueous solution of an organic diamine, adding a water immiscible organic solvent, agitating to uniformly disperse the saturated particles in said water immiscible organic solvent, whereby a plurality of discrete interfaces are formed between said aqueous solution and said water immiscible organic solvent, adding an organic dicarboxylic acid halide soluble in said organic solvent, whereby said organic diamine and said organic dicarboxylic acid halide polymerize at said interfaces to form polyamide capsules substantially enclosing each of said particles.

8. A process for the encapsulation of finely divided particles in individual polymeric capsules comprising absorbing up to about seven parts by weight of an aqueous solution of a polymer-forming first reactant in one part by weight of the finely divided particles, adding a water immiscible organic solvent, agitating to uniformly disperse the particles in said water immiscible organic solvent, whereby a plurality of discrete interfaces are formed between said aqueous solution and said water immiscible organic solvent, adding a second reactant soluble in said organic solvent whereby said first and second reactants polymerize at said interfaces to form individual polymeric capsules substantially enclosing each of said particles.

9. A process for substantially enclosing finely divided particles with individual polymeric capsules comprising wetting the finely divided particles with acetone, absorbing up to about seven parts by weight of an aqueous solution of a polymer-forming first reactant on said finely divided particles, adding a water immiscible organic solvent, agitating to uniformly disperse the aqueous solution-containing particles in said water immiscible organic solvent, whereby a plurality of discrete interfaces are formed between said aqueous solution and said water immiscible organic solvent, adding a second reactant soluble in said organic solvent whereby said first and second reactants polymerize at said interfaces to form individual polymeric capsules substantially enclosing each of said particles.

10. A process as in claim 9 wherein said aqueous solution further contains an alkaline material as an acid acceptor.

11. A process as in claim 9 wherein said first reactant is present in excess quantity, said excess first reactant constituting an alkaline material and acting as an acid acceptor.

12. A process as in claim 9 wherein said particles are cellulose.

13. A process as in claim 9 wherein said first reactant is 1,6 hexanediamine and said second reactant is adipoyl chloride and the polymer formed is nylon 6,6.

14. A process for substantially encasing finely divided particles with a polymeric capsule comprising treating the finely divided particles with an amount of first solvent containing a first reactant absorbable by said particles, dispersing said treated particles in a second solvent immiscible with said first solvent, whereby a plurality of discrete interfaces are formed, each of said interfaces being coextensive with the surface of one of said finely divided particles, adding a second reactant soluble in said second solvent, whereby said first reactant reacts with said second reactant at each of said interfaces to form a polymer casing on each of said finely divided particles.

15. A process for forming a self-sustaining article from a plurality of particles which comprises adding a first liquid to finely divided particles to the limit of the capacity of said particles to absorb said liquid, dispersing said first-liquid-containing particles in a second liquid immiscible wth said first liquid, whereby the particles are effectively dispersed at the interfaces of two intermingled liquids, one of said liquids containing a first reactant and the other a second reactant capable of reacting with said first reactant to form a polymer, whereby each of the individual particles is encapsulated by said polymer formed by said reactants, depositing said treated particles into a form, and heating said particles to the softening temperature of the polymer to fuse the particles together into a self-sustaining article.

16. A process as in claim 15 wherein said heating is accompanied by pressing of said treated particles.

17. A process for forming a porous product comprising dispersing finely divided particles at the interfaces of first and second immiscible liquids to create a plurality of interfaces between them, said first liquid containing a first reactant and said second liquid containing a second reactant capable of reacting with said first reactant to form a polymer, whereby each of the individual particles is substantially enclosed by said polymer formed by said reactants, forming said enclosed particles into a self-sustaining article, and treating said particles in said self-sustaining article to dissolve said particles and remove them from said polymer.

18. A process according to claim 17 in which said finely divided particles are cellulose and are treated with sulfuric acid to dissolve them and remove them from the polymer.

19. A process for forming polymer-containing articles which comprises adding a first liquid to finely divided particles to the limit of the capacity of said particles to absorb said liquid, dispersing said first-liquid-containing particles in a second liquid immiscible with said first liquid, whereby the particles are effectively dispersed at the interfaces of two intermingled liquids, one of said liquids containing a first reactant and the other a second reactant capable of reacting with said first reactant to form a polymer whereby each of said particles is substantially encapsulated by shells of said polymer formed by said reactants, depositing said particles into a form, mole (14.7 g.) of 1,6 hexanediamine and 0.254 mole (10.0 g.) of sodium hydroxide were added with stirring. Next, 0.127 mole (23.6 g.) of ethylene glycol bischloroformate were added dropwise to the mixture. The temperature of the mixture increased. The reaction mixture was stirred, then the toluene was decanted, and the residue was washed first with methanol and then with water, and dried. Thus, 20.6 g. of slightly yellow, free-flowing product was recovered consisting of polymer encased cellulose fibers which is equivalent to a polymer content of 37 percent polyurethane, per weight of cellulose.

EXAMPLE XXI

*Encapsulation of acetone-wetted cellulose with polyurethane*

Fifteen grams of cellulose fibers were wetted with 50 ml. of acetone. Then, 87 ml. of water containing 0.127 mole (14.7 g.) of 1,6 hexanendamine and 0.254 mole (10.0 g.) of sodium hydroxide were added. 500 ml. of toluene were added with stirring. Next, 0.127 mole (29.1 g.) of diethylene glycol bischloroformate dissolved in 100 ml. of toluene were added by means of a dropping funnel. The mixture became hot. The mixture was stirred; then the toluene was decanted. Methanol was added with stirring, and the mixture filtered and washed twice with water. The filtrate was allowed to stand overnight. The filtrate was then again filtered and dried. The resultant product contained 7.9 g. of polyurethane which is equivalent to 51.5 percent coating per weight of cellulose. On drying, the polyurethane encased product remained relatively fluffy and no hard lumps were formed. Lumps that did form were easily broken up by hand to produce a free-flowing product.

EXAMPLE XXII

*Preparation of nylon 6,6 by addition of cellulose, containing absorbed hexanediamine, to adipoyl chloride solution*

With rapid stirring 0.0608 M (11.2 g.) of adipoyl chloride were dissolved in 50 ml. of toluene. Ten grams of cellulose were slurried in 50 ml. of water containing 0.122 M (4.9 g.) of sodium hydroxide and 0.0608 M (7.8 g.) of 1,6 hexanediamine. The cellulose containing absorbed water, amine and alkali was slowly added to the adipoyl chloride in toluene solution. After several minutes the toluene was filtered and the product washed with methanol, water and then dried. The nylon-encased cellulose product weighed 14.5 g. (31 percent nylon 6, 6 based on the weight of cellulose).

EXAMPLE XXIII

*Encapsulation with 6, 6 nylon using $Na_2CO_3$*

One hundred grams of cellulose were slurried with 500 ml. of water containing 0.68 M (79 g.) of 1,6 hexanediamine and 1.38 M (146 g.) of sodium carbonate. The cellulose slurry was transferred to a 3 neck flask equipped with a dropping funnel, and 2 liters of toluene were added to the cellulose with good stirring. Then, 0.68 M (120 g.) of adipoyl chloride dissolved in 200 ml. of toluene were slowly added from the dropping funnel to the cellulose-toluene mixture. The temperature rose about 55° C. Stirring was maintained for several minutes after the adipoyl chloride addition was completed. The toluene was then decanted. The product was washed with methanol, filtered, washed with water, re-filtered and dried. The product was then very briefly stirred in a Waring blender to produce a free-flowing, fibrous material. The product weighed 182.4 g. of which 82.4 g. was nylon, 6, 6, encased on the cellulose. The nylon coating was 82.4% by weight of the cellulose.

EXAMPLE XXIV

*Encapsulation of cellulose with nylon 6, 6 in which the cellulose is first mercerized to increase its water retention*

Fifty grams of cellulose, Solka floc, were dispersed in 1.5 liters of 15% sodium hydroxide and allowed to stand with occasional stirring for one-half hour. At the end of that time the solution was diluted to 4 liters and the cellulose filtered. It was then washed four times with 2 liter batches of water and once with 2 liters of slightly acidified water. The cellulose was filtered and dried. Thirty-five grams of the treated cellulose were dispersed in 350 ml. of water containing 0.47 M (54 g.) of 1, 6 hexanediamine and 0.94 M (36.7 g.) of sodium hydroxide. The mixture (which contained some free water) was transferred to a 2 liter, 3 neck flask and to it was added 1 liter of toluene. The mixture was stirred rapidly, and then 0.47 M (81.5 g.) of adipoyl chloride dissolved in 85 ml. of toluene were added by means of a dropping funnel over a period of 15 minutes. Stirring was continued for several more minutes, then the toluene was filtered off and the product washed with methanol, followed by a water wash. The product was then filtered and dried.

The product, in the form of small lumps, weighed 76.9 g. of which 41.9 g. were nylon encapsulated on the cellulose. The 41.9 g. polymer coating was 120 percent of the 35 g. of cellulose substrate. The yield was 41%. The product could easily be restored to a free-flowing fibrous form by a very quick pass through a Waring blender.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. A process for the encapsulation of finely divided particles with a polymer comprising dispersing the finely divided particles at the interfaces of two intermingled, immiscible solutions, one of said solutions containing a first reactant capable of reacting with a second reactant dissolved in the other solution to form a polymer, whereby each of the particles is individually encapsulated by said polymer formed by said reactants.

2. A process for the encapsulation of finely divided particles with a polyfunctional condensation polymer comprising the steps of adding a first solution containing a first reactant to the finely divided particles to the limit of the capacity of said particles to absorb said solution, adding a second solution containing a second reactant, said first and second solutions being immiscible, and said first and second reactants polymerizing upon contact with each other, whereby each of said particles is surrounded by an individual layer of polymer.

3. A process for the encapsulation of finely divided particles with a polymer comprising the steps of treating the finely divided particles with a solution containing a first reactant, thereby associating said first solution and said first reactant with said particles, dispersing said particles with said first solution and said first reactant associated therewith in a second solution immiscible with said first solution, thereby creating a plurality of discrete interfaces between said first solution associated with said particles and said second solution, and adding a second reactant soluble in said second solution, said second reactant being reactive with said first reactant to form a polymer, whereby each of said particles is individually encapsulated by said polymer formed by said reactants.

4. A process for substantially enclosing finely divided particles in a polymer comprising dispersing an aqueous first softening and then hardening said polymer shells to fuse said polymer shells together into a self-sustaining article.

20. A process as in claim 19 wherein said softening comprises treating said encapsulated particles with a solvent.

References Cited by the Examiner

UNITED STATES PATENTS

| | | |
|---|---|---|
| 2,013,702 | 9/1935 | Smidth. |
| 2,171,765 | 9/1939 | Rohn et al. _____ 260—41 XR |
| 2,183,857 | 12/1939 | Turkington. |
| 2,504,208 | 4/1950 | Locke et al. _____ 106—171 |
| 2,702,924 | 3/1955 | Plourde _____ 264—4 |
| 2,797,201 | 6/1957 | Veatch et al. _____ 18—48 XR |
| 2,933,415 | 4/1960 | Homer et al. |
| 3,001,582 | 9/1961 | Kindseth et al. ___ 264—126 XR |
| 3,033,805 | 5/1962 | Rubens et al. _____ 260—2.5 |
| 3,055,846 | 9/1962 | Flack et al. _____ 260—2.5 |
| 3,069,292 | 12/1962 | Alexander et al. |
| 3,092,438 | 6/1963 | Kruger _____ 117—100 XR |
| 3,121,698 | 2/1964 | Orsino et al. |
| 3,138,478 | 6/1964 | Hedman et al. ___ 117—100 XR |

ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,272,897                          September 13, 1966

Daniel F. Herman et al.

It is hereby certified that error appears in the above numbered patent requiring correction and that the said Letters Patent should read as corrected below.

Column 5, line 42, after "since" insert -- it --; column 7, line 69, for "0.40" read -- 0.408 --; column 8, line 49, for "0.22M" read -- 0.122M --; column 10, line 58, strike out "the"; column 11, line 40, for "1,2 g." read -- 1.2 g. --; column 13, line 20, for "hexanendamine" read -- hexanediamine --.

Signed and sealed this 29th day of August 1967.

(SEAL)
Attest:

ERNEST W. SWIDER
Attesting Officer

EDWARD J. BRENNER
Commissioner of Patents